United States Patent

Frait et al.

[19]

[11] Patent Number: 4,555,120
[45] Date of Patent: Nov. 26, 1985

[54] POSITION SENSOR

[75] Inventors: John S. Frait; Clark E. Lowman, both of Ann Arbor, Mich.; George W. Morris, III, Greenville, S.C.; Leonard T. Tribe, Seal Beach, Calif.

[73] Assignee: Kelsey-Hayes Co., Romulus, Mich.

[21] Appl. No.: 540,083

[22] Filed: Oct. 7, 1983

[51] Int. Cl.$^4$ .............................................. B60G 11/26
[52] U.S. Cl. ..................................... 280/6.1; 280/707; 280/DIG. 1; 324/208
[58] Field of Search ............... 280/6 R, 6 H, 6.1, 707, 280/DIG. 1; 324/207, 208, 235

[56] References Cited

U.S. PATENT DOCUMENTS

| | | | |
|---|---|---|---|
| 3,049,359 | 8/1962 | Geyer | 280/6.1 |
| 3,473,109 | 10/1969 | Maaz et al. | 324/208 |
| 4,054,295 | 10/1977 | Elliott | 280/707 |
| 4,105,216 | 8/1978 | Graham et al. | 280/707 |
| 4,107,604 | 8/1978 | Bernier | 324/208 |
| 4,204,158 | 5/1980 | Ricouard et al. | 324/208 |
| 4,236,074 | 11/1980 | Chen | 280/707 |
| 4,310,172 | 1/1982 | Claude et al. | 280/707 |

*Primary Examiner*—Joseph F. Peters, Jr.
*Assistant Examiner*—Kenneth R. Rice
*Attorney, Agent, or Firm*—Ralph J. Skinkiss; Oliver E. Todd, Jr.; Mark J. Sobanski

[57] ABSTRACT

The present invention relates to a position sensor which can be utilized as a height sensor in an automatic vehicle suspension system. The sensor comprises a telescoping assembly including an elongate shaft having one end which is axially slidable within an outer housing. The telescoping assembly is connected between sprung and unsprung vehicle frame members. The outer ends of the shaft and the housing are each provided with a unique bifurcated socket unit and an associated retaining clip for attachment to a ball element connection point on the associated vehicle frame member. A pair of magnets are carried by the shaft and are adapted to generate a first magnetic field having one polarity and extending axially along a first portion of the shaft and a second magnetic field having an opposite polarity and extending axially along a second portion of the shaft. A pair of axially spaced apart Hall effect switches are carried by the housing and are responsive to the first and second magnetic fields along the shaft for generating logic signals representing the relative position between the movable vehicle frame members. A separate concentrator element is positioned adjacent each of the Hall effect switches for increasing the intensity of the magnetic field in the region of respective switch. Also disclosed is a simplified method for installing the position sensor on the vehicle.

30 Claims, 10 Drawing Figures

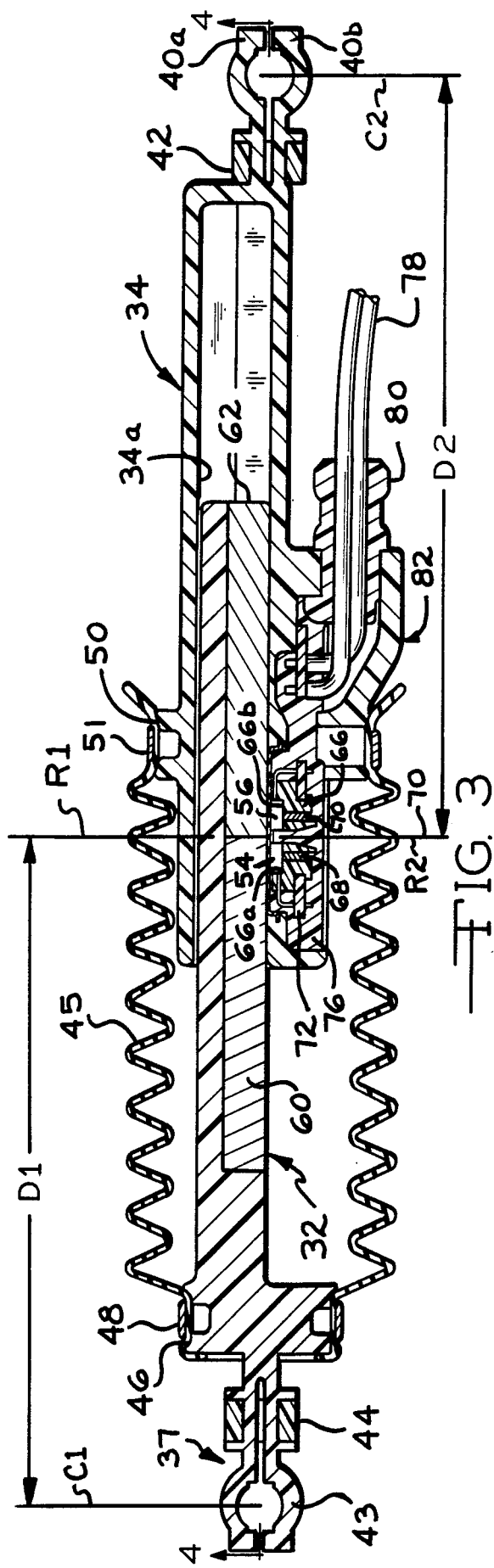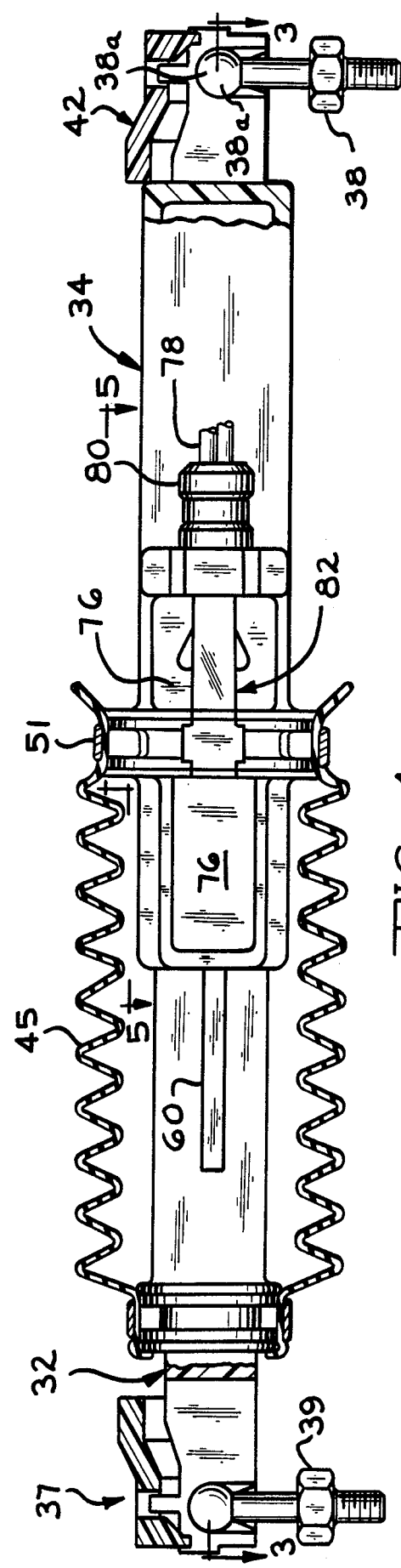

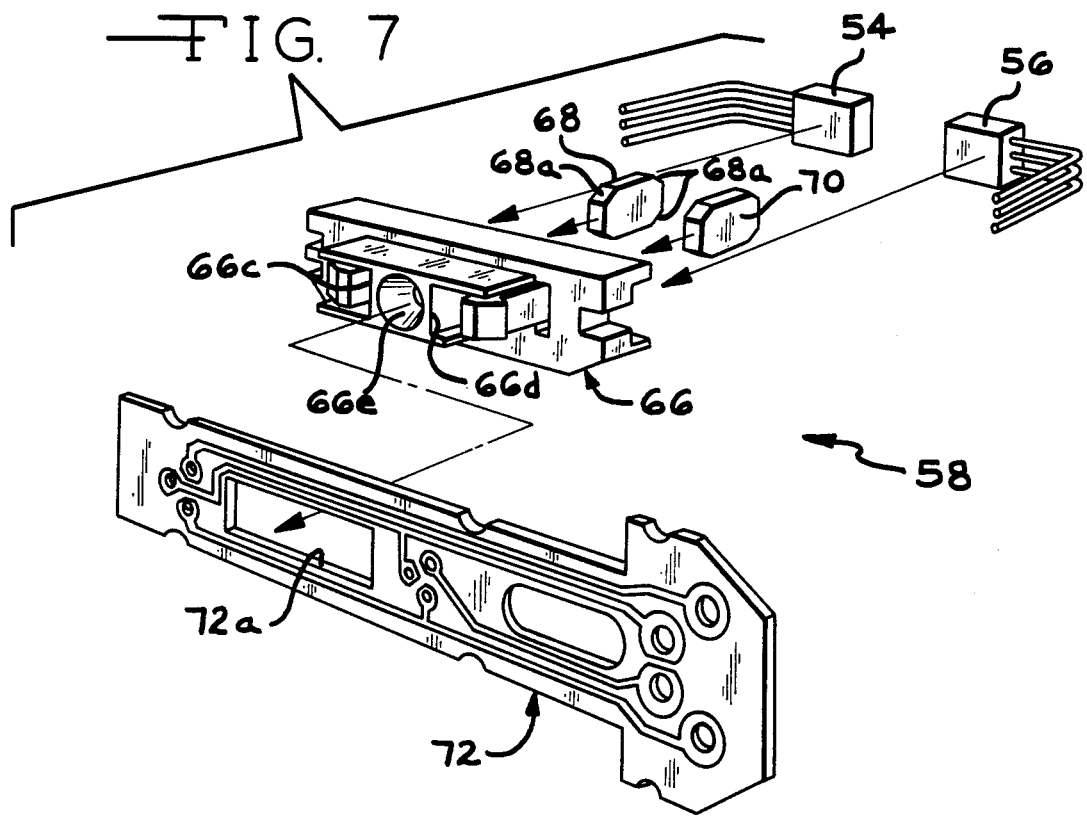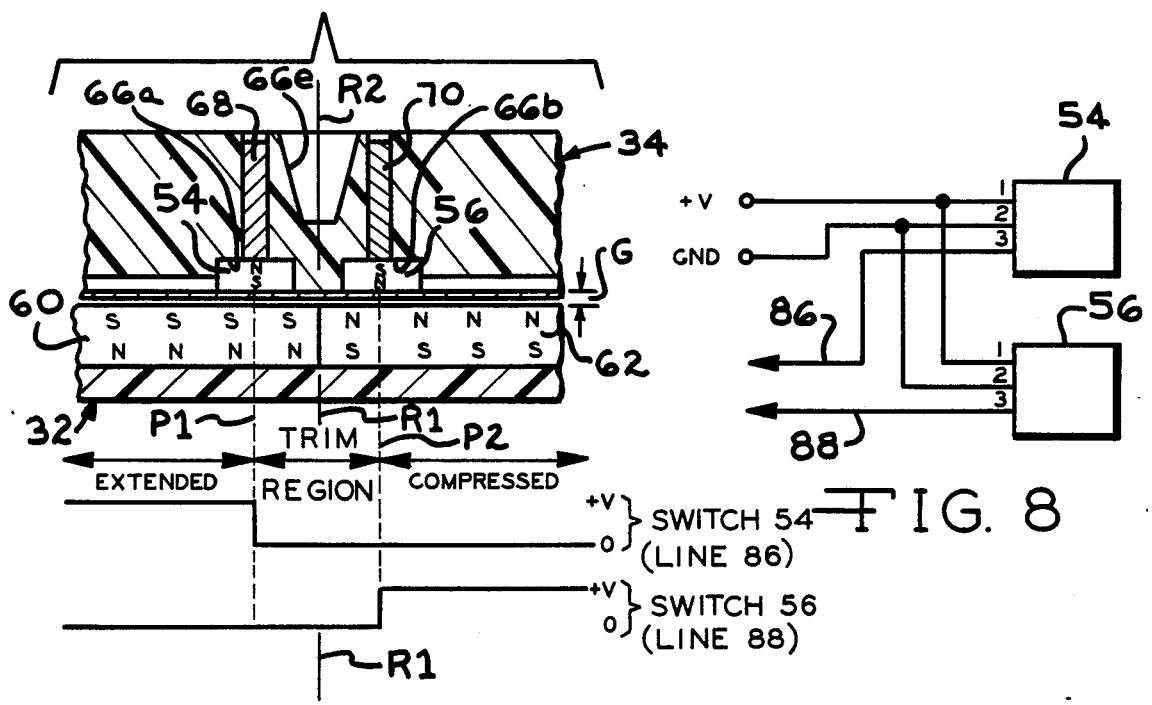

POSITION SENSOR

BACKGROUND OF THE INVENTION

The present invention relates generally to a position sensor for generating a position signal representing the relative position between two members movable relative to one another. More particularly, the present invention concerns a position sensor which is adapted for use as a height sensor in a computer controlled vehicle suspension system.

Various types of vehicle height sensors have been proposed. For example, U.S. Pat. No. 4,105,216 to Graham et al. discloses a vehicle height sensor which utilizes a pair of optical switches each comprising a light emitting diode (LED) and an associated photo transistor. A light shuttering arrangement is located between each LED and its respective photo transistor and is movable in response to relative movement between the sprung mass and unsprung mass of the vehicle. The optical switches generate logic signals representing whether the sprung mass of the vehicle is within a selected trim band, above the selected trim band, or below the selected trim band.

Other types of switching devices have also been proposed for use in vehicle height sensors which generate logic level output signals. U.S. Pat. No. 4,054,295 to Elliot discloses a position sensor which utilizes a pair of magnetic reed switches mounted on the sprung mass and responsive to a magnet movable with the unsprung mass. U.S. Pat. No. 4,236,074 to Chen discloses a vehicle height sensor which utilizes a pair of beta detectors mounted on the sprung mass for sensing the position of two radioactive material sources movable with the unsprung mass.

U.S. Pat. No. 4,310,172 to Claude et al. discloses a vehicle height sensor which utilized a pair of Hall effect switches as the switching devices. In one embodiment, magnets are located on a pair of followers attached for movement with the unsprung mass. A pair of Hall effect switches mounted for movement with the sprung mass detect the magnetic fields generated by the magnets and thereby the position of the followers to determine the relative position between the sprung and unsprung masses. In a second embodiment, the magnets and Hall effect switches are mounted on the sprung mass in spaced apart relationship. A pair of followers attached for movement with the unsprung mass are adapted to selectively interrupt the magnetic field between a magnet and the associated Hall effect switch to generate logic signals representative of the relative position between the sprung and unsprung masses.

SUMMARY OF THE INVENTION

The present invention concerns a position sensor which can be utilized as a height sensor in a vehicle suspension system. The sensor comprises a first component slidable along an axis relative to a second component. Connection means are provided for mounting the sensor between sprung and unsprung members of the vehicle suspension system such that relative movement between the sprung and unsprung members causes slidable movement between the first and second components.

A pair of magnets are carried by the first component and are adapted to generate a first magnetic field having one polarity and extending axially along a first portion of the first component and a second magnetic field having an opposite polarity and extending axially along a second portion of the first component. A pair of axially spaced apart detector devices such as Hall effect switches are carried by the second component and are responsive to the magnetic fields along the first component for generating a pair of logic signals representing the relative position between the sprung and unsprung members of the vehicle to which the sensor is attached. A separate flux concentrator means is positioned adjacent each of the detector devices for increasing the intensity of the magnetic field in the region of the detector devices. The position signal is generated in digital form and indicates whether (1) the sprung member is located within a predetermined trim region relative to the unsprung member, (2) the sprung member is above the predetermined trim region, or (3) the sprung member is below the predetermined trim region.

In the preferred embodiment of the invention, the first component is an elongate shaft and the second component is an elongate housing having a longitudinally extending cavity formed therein for slidably receiving one end of the shaft. The outer ends of the shaft and the housing are each provided with a unique bifurcated socket unit and an associated retaining clip for attachment to a ball element connection point on the associated vehicle frame member. The present invention also concerns a simplified method of installing the position sensor on the vehicle.

BRIEF DESCRIPTION OF THE DRAWINGS

The above, as well as other features of the present invention, will be readily apparent to one skilled in the art from reading the following detailed description in conjunction with the following drawings in which:

FIG. 3 is a sectional view of an assembled version of the position sensor;

FIG. 4 is a partial elevational, partial sectional view of the position sensor taken along the line 4—4 of FIG. 3;

FIG. 7 is an exploded perspective view of the circuit board assembly shown in FIG. 2;

FIG. 8 is a schematic view of the circuit of the present invention;

FIG. 9, is a schematic view illustrating the logic signals generated by the position sensor as the magnets are moved relative to the detector devices.

DESCRIPTION OF THE PREFERRED EMBODIMENT

Figure 1:
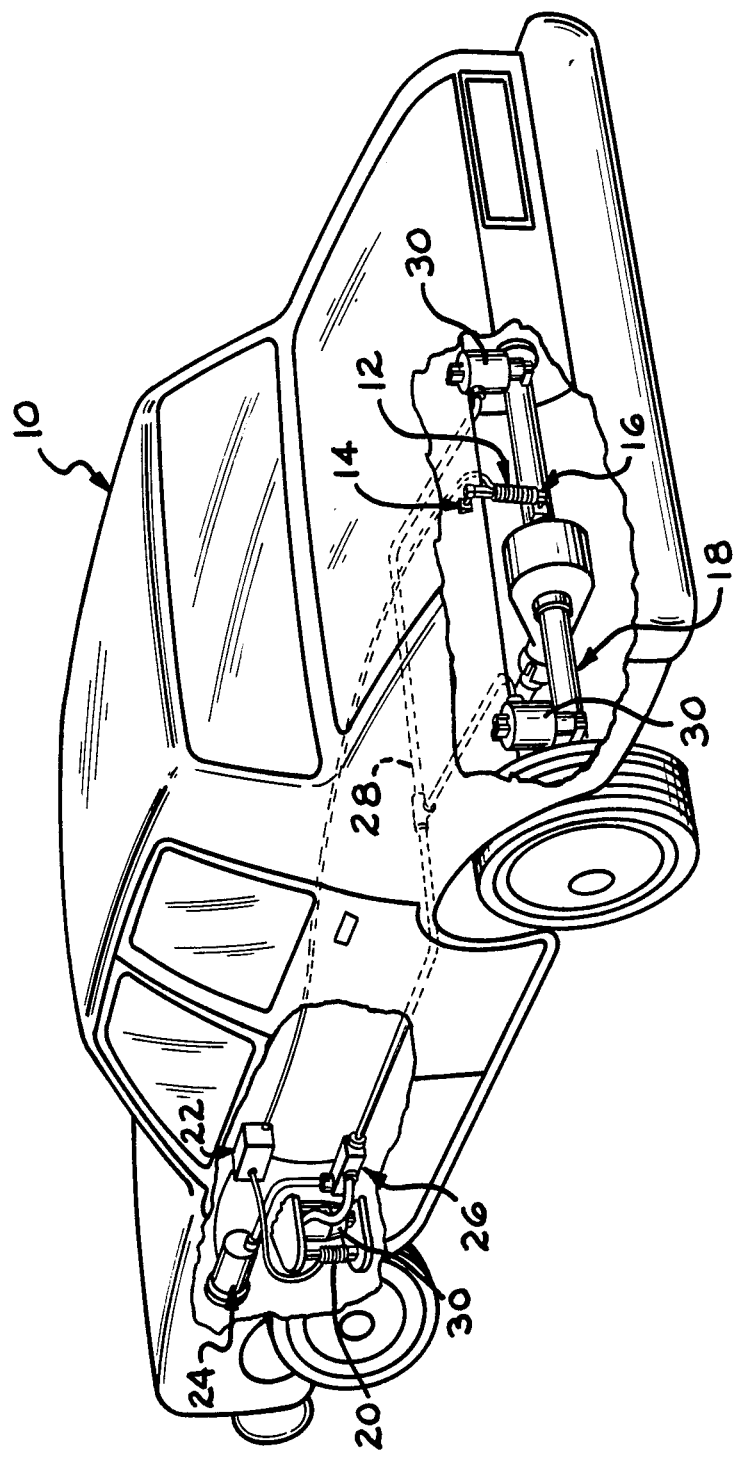
FIG. 1 is a perspective view which schematically represents a vehicle height suspension control system which utilizes the position sensors of the present invention.

Referring to FIG. 1, there is shown a perspective view of a vehicle 10 having a computer controlled suspension system which utilizes the position sensors of the present invention. It should be noted at the outset of this description that, while the position sensor is described for use as a vehicle height sensor, it will be appreciated that the sensor can be utilized in other applications wherein it is desired to sense the relative position between two members which are relatively moveable with respect to one another.

In FIG. 1, a position sensor 12 includes a telescoping assembly having an upper end which is connected at 14 to a sprung member of the vehicle frame and a lower end which is connected at 16 to an unsprung member of the vehicle frame such as a rear axle and differential assembly 18. A second position sensor 20 is connected between sprung and unsprung members of the vehicle frame located near the left front wheel and tire assembly, while a third position sensor (not shown) can be connected between sprung and unsprung members of the vehicle frame near the right front wheel and tire assembly. Each of the individual position sensors functions to generate a separate position signal to a microprocessor-based computer control unit 22. Each position signal represents the relative position between the sprung and unsprung members to which the respective sensor is connected. The control unit 22 is coupled to control an air compressor 24 and valve assembly 26 connected to selectively supply pressurized air through conduits 28 to individual air springs 30 located at each wheel assembly.

Collectively, the three individual position sensors provide the computer control unit 22 with data which enables the control unit to determine whether the vehicle 10 is situated at the desired height. Based on the data obtained from the individual position sensors, the computer control unit 22 regulates the air pressure in each of the air springs 30 in order to maintain the vehicle at the desired height.

Figure 2:
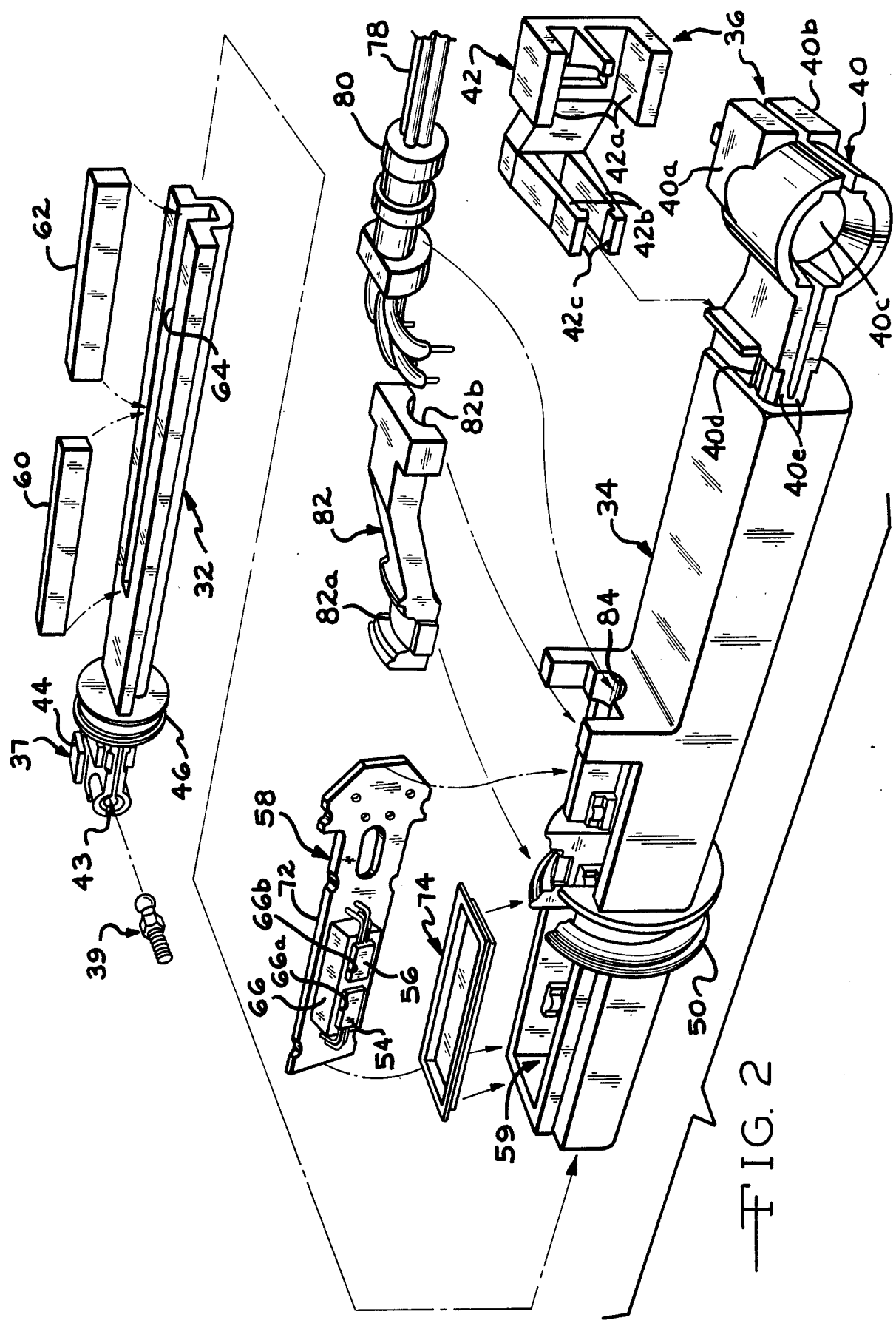
FIG. 2 is an exploded perspective view of a position sensor according to the present invention.

The position sensor 12 is shown in more detail in FIGS. 2, 3, and 4. Referring to these figures, the sensor 12 comprises a telescoping assembly which includes a shaft 32 having one end slidably mounted within a longitudinally extending cavity 34a formed in a housing 34. The outer end of the housing 34 is provided with a connection means 36 which is connected to a vehicle frame member (not shown) by means of a threaded fastener 38 (shown in FIG. 4) having a ball end 38a. The outer end of the shaft 32 is provided with a similar connection means 37 which is adapted to be connected to another vehicle frame member by a fastener 39.

The connection means 36 includes a bifurcated socket unit 40 having spaced apart socket arms 40a and 40b which define a socket 40c for receiving and retaining the ball end 38a of the fastener 38. A retaining clip 42 is adapted to be releasably secured to the socket unit 40 and includes spaced apart retaining arms 42a which, when the clip 42 is in the locked position, secure the ball 38a within the socket 40c by preventing the socket arms 40a and 40b from moving away from one another. The retaining clip 42 includes spaced apart clip elements 42b having tabs 42c to releasably secure the retaining clip to the socket unit 40. The clip 42 is movable between an unlocked position wherein the tabs 42c engage notched portions 40d on the socket arms 40a and 40b, and a locked position wherein the tabs 42c engage notched portions 40e. When the clip 42 is in the unlocked position, the retaining arms 42a are spaced from the socket arms 40a to enable the arms 40a to expand to release or receive the ball end 38a. When the clip 42 is in the locked position, the retaining arms 42a are positioned over the socket arms 40a to prevent the arms 40a from expanding. The connection means 38 at the end of the shaft 32 is similar to the connection means 36 and includes a bifurcated socket unit 43 and an associated retaining clip 44.

A protective rubber boot 45 has one end secured about an annular mounting flange 46 located near the outer end of the shaft 32 by means of a securing ring 48, and has an opposite end secured about an annular mounting flange 50 provided on the housing 34 by means of a securing ring 51. The protective boot 45 prevents dirt from entering the housing cavity 34a and affecting the slidable movement between the shaft 32 and the housing 34.

Figure 6:
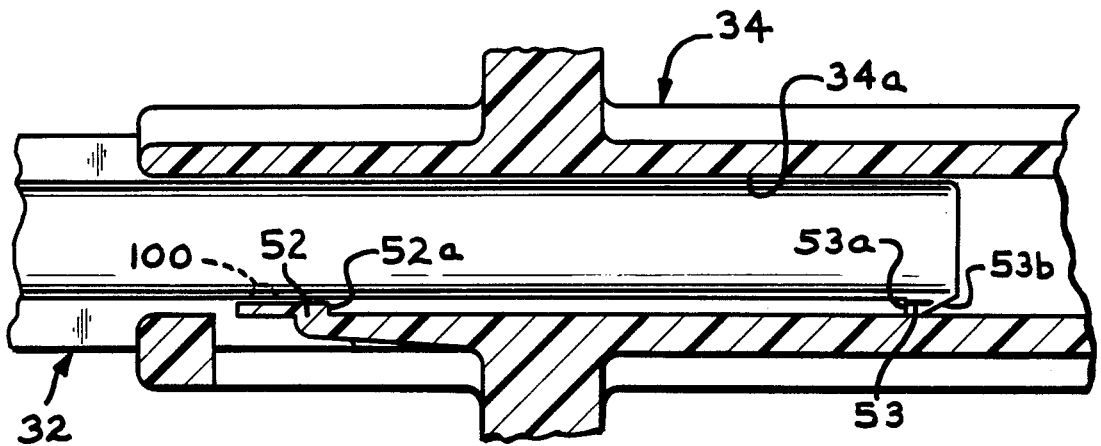
FIG. 6 is a sectional view taken along the line 6—6 of FIG. 5.
Figure 5:
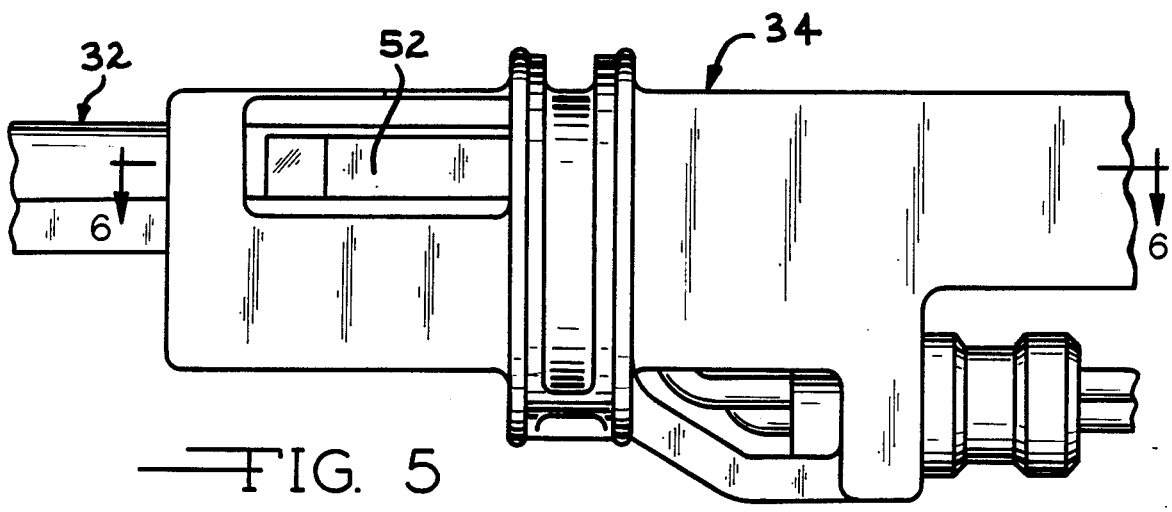
FIG. 5 is a side elevational view illustrating the retaining finger of the housing assembly taken along the line 5—5 of FIG. 4.

As shown in FIGS. 5 and 6, the housing 34 is provided with a retaining finger 52 having a shoulder 52a which, when the sensor assembly is fully extended, engages a shoulder 53a of a projection 53 formed at the inner end of the shaft 32 to prevent the shaft 32 from being withdrawn from the housing cavity 34a. The projection 53 is provided with an inclined portion 53b to facilitate the insertion of the shaft into the housing cavity 34a.

As shown in FIGS. 2 and 3, the position sensor includes a pair of Hall effect digital switches 54 and 56 which are mounted on a circuit board assembly 58 positioned within a recess 59 formed in the housing 34. The switches 54 and 56 are responsive to a magnetic field generated by a pair of magnets 60 and 62 mounted in the shaft 32 for generating an output signal representative of the position of the shaft 32 relative to the housing 34. As shown in FIG. 2, the magnets 60 and 62 are adapted to be inserted within an elongate slot 64 formed in the shaft 32. The magnets 60 and 62 are positioned within the slot 64 such that the adjacent ends of the magnets are in abutting relationship along a reference line R1 which, as shown in FIG. 3, is spaced a predetermined distance D1 from a centerline C1 extending through the socket unit 43. As will be discussed, one of the magnets 60 and 62 is inserted into the shaft slot 64 such that the north pole of the magnet faces outwardly from the shaft, while the other one of the magnets is inserted into the slot 64 such that the south pole of the magnet faces outwardly. The magnets 60 and 62 cooperate to produce a magnetic field extending longitudinally along the shaft 32.

As shown in FIGS. 2 and 3, the Hall effect digital switches 54 and 56 are adapted to be mounted in spaced apart relationship within recesses 66a and 66b respectively formed in the one side of a carrier 66. In order to increase the magnetic field in the region of the Hall effect switches, magnetic flux concentrator elements 68 and 70 (shown in FIG. 7) are inserted into slots 66c and 66d formed in the carrier 66 adjacent each of the Hall effect switches. As will be discussed, the concentrator elements 68 and 70 increase the intensity of the magnetic field in the region of the Hall effect switches to result in improved operation of the position sensor. As shown in FIG. 7, the carrier 66 is adapted to be snapped into a cutout 72a formed in a circuit board 72.

In order to ensure that the Hall effect switches are as close as possible to the magnets 60 and 62, a thin aluminum plate 74 is positioned within the housing recess 59 and forms a portion of the inner wall of the housing cavity 34a. As shown in FIG. 3, the circuit board assembly 58 is positioned within the housing recess 59 such that a reference line R2, which defines the center position between the switches 54 and 56, is spaced a predetermined distance D2 from a centerline C2 extending through the socket unit 40. In order to facilitate the positioning of the circuit board assembly within the housing cavity 34a, a locating aperture 66e (shown in FIGS. 7 and 9) is centered in the carrier 66 between the Hall effect switches 54 and 56. A positioning pin (not shown in the drawings) can be inserted into the aperture 66e and used to locate the reference line R2 the predetermined distance D2 from the centerline C2. After the circuit board has been positioned in the recess 59, a potting compound 76 (shown in FIGS. 3 and 4) is utilized to fill the recess and maintain the circuit board assembly in its set position.

A cable 78 includes a group of four wires adapted to be connected to selected points on the circuit board 72. A grommet 80 encompasses an end portion of the cable 78. A retaining clip 82 is positioned over the circuit board assembly 58 and has one end provided with a segmented annular portion 82a which forms a portion of the annular flange 50 for mounting one end of the protective boot 45. The opposite end of the clip 82 is provided with an annular groove 82b which cooperates with an annular groove 84 formed in the housing 34 for clamping the cable grommet 80 to the housing.

There is shown in FIG. 8 a schematic diagram of the circuit of the present invention. The Hall effect switches 54 and 56 can each be a UGS-3030T digital switch available from Sprague Electric Company of Concord, N.H. Each of the Hall switches have power supply terminals 54-1 and 56-1 connected to a +V power supply, and ground terminals 54-2 and 56-2 connected to the circuit ground potential. The switch 54 has an output terminal 54-3 connected to generate a logic level output signal on the line 86. The switch 56 has an output terminal 56-3 connected to generate a logic level output signal on the line 88. Together, the signals on the lines 86 and 88 provide a logic signal pair representative of the position of the shaft relative to the housing. As will be discussed, by providing a pair of switches, the sensor can generate separate logic signal pairs which represent whether (1) the vehicle height is within a desired trim region, (2) the vehicle height is above the trim region, or (3) the vehicle height is below the trim region.

Referring to FIG. 9, there is shown the manner in which the logic signals on the lines 86 and 88 are generated in order to provide an indication as to the position of the shaft 32 relative to the housing 34. As previously mentioned, the magnets 60 and 62 are positioned within the shaft 32 such that one of the magnets has its south pole facing the Hall switches, while the other magnet has its north pole facing the Hall switches. Thus, the magnetic field generated along the shaft 32 by the magnets 60 and 62 has a first polarity along one portion of the shaft 32, and an opposite polarity along a second portion of the shaft. In FIG. 9, the magnet 60 has its south pole facing upwardly, while the magnet 62 has its north pole facing upwardly.

The Hall effect switches 54 and 56 are inserted into the carrier such that one of the switches is activated by one of the magnets, while the other one of the switches is activated by the other one of the magnets. Thus, if both of the switches 54 and 56 are identical, they are inserted into the carrier recesses 66a and 66b in opposite directions. In FIG. 9, the south pole seeking side of the Hall switch 54 faces the magnets 60 and 62 while the north pole seeking side of the Hall switch 56 faces the magnets. When the switch 54 is positioned adjacent the magnet 60, the switch 54 is in the on state and generates a low level logic signal on the line 86 near ground potential and, when the switch is adjacent the magnet 62, the switch 54 is in the off state and the line 86 will be at a high logic level near the +V potential. The switch 56 generates a low level signal when adjacent the magnet 62 and a high level logic signal when adjacent the magnet 60.

The flux concentrator elements 68 and 70 function to focus the magnetic field through the respective Hall effect switch and thus increase the intensity of the field in the region of the switches. This increase in the intensity of the magnetic field is especially important due to the distance of the gap G (shown in FIG. 9) between the Hall effect switches and the magnets. The concentrator elements 68 and 70 are constructed of a ferromagnetic material such as iron or steel and are positioned adjacent the switches 54 and 56 respectively on the side of the switches opposite the magnets. Preferably, the concentrator elements are constructed of a mild ferromagnetic material which do not produce a residual magnetic field. The elements 68 and 70 are relatively thin plates which are positioned in perpendicular relationship with the longitudinal axis of the sensor. The concentrator element 68 is in alignment with a reference line P1 which extends through the active area of the switch 54, while the concentrator element 70 is in alignment with a reference line P2 which extends through the active area of the switch 56.

While the exact shape of the concentrator elements can vary from application to application, it has been found that concentrator elements as shown in FIG. 7 functions effectively. In FIG. 7, the concentrator element 68 is constructed of a relatively thin rectangular plate having a chamfer 68a cut from each corner of the plate. The concentrator element 70 can be constructed in a similar manner.

When the reference line R1 of the shaft 32 is aligned with the reference line R2 of the housing 34, the magnets 60 and 62 and the Hall effect switches 54 and 56 will be positioned as shown in FIG. 9. In this instance, both of the Hall effect switches will be in the on state and generate low logic level signals on the lines 86 and 88. A low level logic signal from each of the switches represents that the portion of the vehicle to which the respective sensor is connected is at its desired height. The distance between the lines P1 and P2 is defined in FIG. 9 as the "trim region" and represents the region in which the reference line R1 of the shaft 32 can move relative to the housing 34 while maintaining a low level logic signal at the output of each Hall effect switch. The distance of the trim region is set by selecting a predetermined spacing between the switches.

As the position sensor is extended, the reference line R1 moves to the left as viewed in FIG. 9. When the reference line R1 approaches the line P1, the switch 54 is responsive to the magnetic field generated by the magnet 62 and switches off to generate a high level logic signal on the line 86. Further extension of the position sensor causes the Hall switches 54 and 56 to continue to generate high and low level logic signals, respectively. As the position sensor is compressed, the reference line R1 is moved to the right as viewed in FIG. 9. When the reference line R1 approaches the line P2, the Hall switch 56 is responsive to the magnetic field generated by the magnet 60 and switches off to generate a high level logic signal on the output line 88. As mentioned above, the region in which both Hall devices generate a low logic level signal represents the trim region wherein the position of the sensor is at the desired location.

It will be appreciated that, if the position sensor is operating properly, the logic signals on the lines 86 and 88 will never both be at a high level. Thus, situations wherein a high level logic signal is simultaneously present on the lines 86 and 88 can be interpreted as a malfunction in the sensor or the associated wiring.

Figure 10:
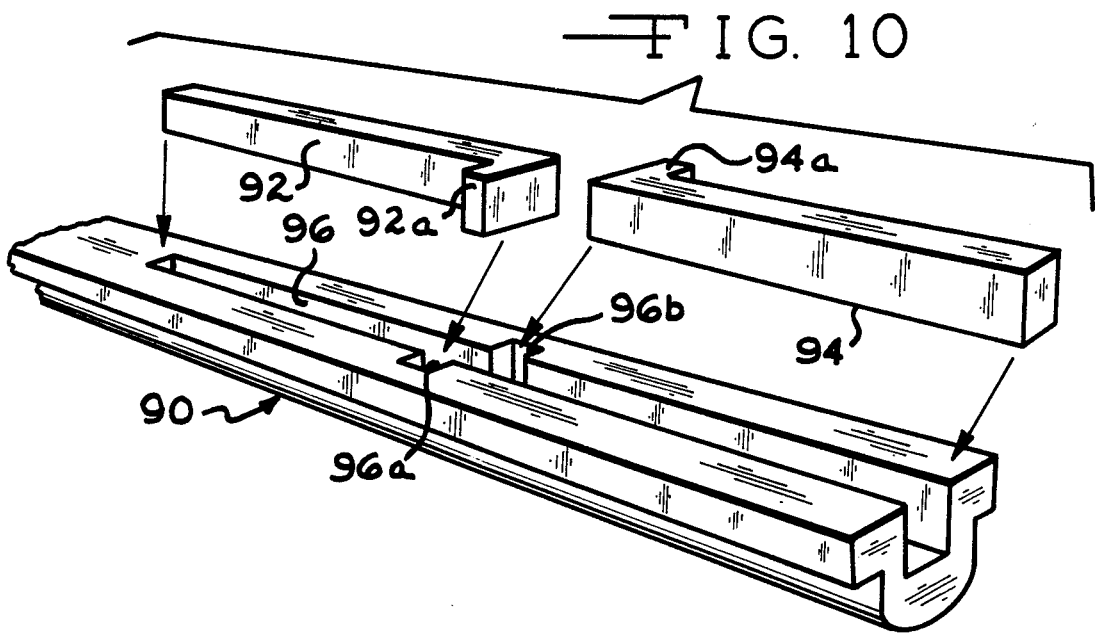
FIG. 10 is an exploded perspective view illustrating an alternate embodiment of the magnets of FIG. 2.

Referring to FIG. 10, there is shown an exploded perspective view of an alternate embodiment of a shaft 90 and a pair of magnets 92 and 94 which can be utilized in the position sensor according to the present invention. As shown in FIG. 10, each of the magnets 92 and 94 are L-shaped and have leg portions 92a and 94a which extend perpendicularly relative to the elongate body of the respective magnet. The shaft 90 is provided with an elongate slot 96 having notched portions 96a and 96b adapted to receive the leg portions 92a and 94a respectively. Such a configuration is highly desirable from an assembly standpoint, since the shaft 90 is constructed to only receive the magnets in a predetermined arrangement. This ensures that the magnets are properly inserted within the slot formed in the shaft.

In addition to ensuring that the magnets are properly oriented within the shaft, the leg portions 92a and 94a can be used during the assembly of the shaft components to properly position the reference line R1 relative to the centerline C1 of the socket assembly 37. For example, a locating device (not shown in the drawings) can engage the leg portion 92a to locate the one end of the magnet 92 along the reference line R1, while the other magnet 94 can be urged into abutting relationship with the magnet 92.

The method by which the position sensor can be attached to the vehicle frame members will now be discussed. Initially, the sprung and unsprung frame members between which the sensor is to be connected are spaced a predetermined distance from one another. One of the sprung or unsprung members is provided with a fixed connection point, while the other one of the members is provided with an adjustable connection point. For example, in FIG. 1, the connection point 16 can be fixed relative to the axle and differential assembly 18, while the connection point 14 can be provided with suitable adjustment means (not shown) to enable the connection point to be moved relative to the associated sprung frame member.

Next, the two slidable components of the position sensor (shaft 32 and housing 34) are temporarily secured together to establish a predetermined spacing between the two connection means 37 and 42 and prevent relative movement between the two components. The predetermined spacing between the connection means 37 and 42 is defined by the distance between the centerlines C1 and C2 (shown in FIG. 3). This distance is a function of the predetermined spacing between the sprung and unsprung frame member and is set such that the reference lines R1 and R2 are properly positioned relative to one another based on the predetermined spacing between the members. For example, if the predetermined spacing between the frame members represents the spacing when the vehicle is at the desired height, the slidable components of the sensor are temporarily secured with reference lines R1 and R2 in alignment with one another, as shown in FIG. 3.

The step of temporarily securing the shaft 32 to the housing 34 can be accomplished by spot welding a portion of the housing to the shaft. For example, as shown in FIG. 6, the retaining finger 52 can be ultrasonicly spot welded to the shaft 32, as represented by dashed line 100, such that a predetermined shear force between the shaft 32 and the housing 34 is required to break the weld.

After the predetermined spacing has been established between the connection means of the sensor, one of the connection means is attached to the fixed connection point, and the other connection means is attached to the adjustable connection point. Next, the adjustable connection point is secured relative to its associated frame member. The two members can then be permitted to move relative to one another, thereby causing the spot weld 100 to break and permit slidable movement between the components of the position sensor. The above method eliminates the need to preset the spacing between the vehicle connection points 14 and 16 prior to the attachment of the sensor to the vehicle.

In accordance with the provisions of the patent statutes, the principle and mode of operation of the invention have been described in what is considered to represent its preferred embodiment. However, it should be noted that the invention may be practiced otherwise than as specifically illustrated and described without departing from its spirit or scope.

What is claimed is:

1. A position sensor for determining the relative position between two members relatively movable with respect to one another, said sensor comprising:
   an assembly including a first component slidable relative to a second component;
   means for attaching said first component to one of the relatively movable members and said second component to the other one of the relatively movable members;
   magnet means carried by said first component for generating a first magnetic field having a first polarity and extending along a first portion of said first component and for generating a second magnetic field having an opposite polarity and extending along a second portion of said first component; and
   detector means including a pair of spaced apart detector devices carried by said second component and responsive to the first and second magnetic fields for generating a position signal representative of the position between the two members, one of said detector devices generating a first logic signal at a high level when proximate said first magnetic field and at a low level when proximate said second magnetic field, and the other one of said detector devices generating a second logic signal at a low level when proximate said first magnetic field and at a high level when proximate said second magnetic field.

2. The sensor according to claim 1 including a carrier adapted to be mounted in said second component, said carrier provided with a pair of spaced apart recesses, each recess adapted to receive a separate one of said detector devices, said carrier provided with a locating means for positioning said carrier a predetermined distance relative to said attaching means on said second component.

3. The sensor according to claim 1 wherein at least one of said detector devices is a Hall effect switch.

4. The sensor according to claim 1 including a concentrator means positioned adjacent at least one of said detector devices for increasing the intensity of the magnetic field in the region of said one detector device.

5. The sensor according to claim 4 wherein said concentrator means includes a generally flat plate element located perpendicular to the axis of the sensor.

6. The sensor according to claim 1 including a first concentrator means positioned adjacent one of said detector devices for increasing the intensity of the magnetic field in the region of said one detector device and a second concentrator means positioned adjacent the other one of said detector devices for increasing the intensity of the magnetic field in the region of said other detector device.

7. The sensor according to claim 1 wherein said magnet means includes a first magnet for generating the first magnetic field and a second magnet for generating the second magnetic field.

8. The sensor according to claim 7 wherein said first and second magnets abut one another.

9. The sensor according to claim 7 wherein said first component includes an elongate shaft and said second component includes an elongate housing having a longitudinally extending cavity formed therein for slidably receiving one end of said shaft.

10. The sensor according to claim 1 wherein the position signal represents whether the relative position between the two members is within a predetermined trim region, whether the relative position between the two members is on one side of the trim region, or whether the relative position between the two members is on the other side of the trim region.

11. A position sensor for determining the relative position between two members relatively movable with respect to one another, said sensor comprising:
an assembly incuding a first component slidable along an axis relative to a second component, said first component including an elongate shaft and said second compoent including an elongate housing having a longitudinally extending cavity formed therein for slidably receiving one end of said shaft;
means for attaching said first component to one of the relatively movable members and said second component to the other one of the relatively movable members;
magnet means carried by said first component for generating a first magnetic field having a first polarity and extending axially along a first portion of said first component and for generating a second magnetic field having an opposite polarity and extending axially along a second portion of said first component, said magnet means including a first magnet for generating the first magnetic field and a second magnet for generating the second magnetic field, said first and second magnets being generally elongate and said shaft provided with an elongate slot for receiving said magnets; and
detector means carried by said second component and responsive to the first and second magnetic fields for generating a position signal representative of the position between the two members.

12. The sensor according to claim 11 wherein said first and second magnets abut one another.

13. The sensor according to claim 12 including means for positioning said first and second magnets in abutting relationship with one another such that said first and second magnets contact each other at a point located a predetermined distance relative to said attaching means on said first component.

14. The sensor according to claim 11 wherein said first and second magnets each include an elongate main body having a leg portion extending generally perpendicular from said main body.

15. In a vehicle suspension system including adjustable spring means positioned between sprung and unsprung frame members of a vehicle, at least one height sensor connected between sprung and unsprung frame members of the vehicle for generating a position signal representative of the height of the sprung frame member relative to the unsprung frame member, and control means responsive to the position signal for adjusting said spring means to set the distance between the sprung and unsprung members at a predetermined amount, said height sensor comprising:
an assembly including a first component slidable along an axis relative to a second component;
means for attaching said first component to one of the sprung and unsprung frame members and said second component to the other one of the sprung and unsprung frame members;
magnet means carried by said first component for generating a first magnetic field having a first polarity and extending axially along a first portion of said first component and for generating a second magnetic field having an opposite polarity and extending axially along a second portion of said first component; and
detector means including a pair of axially spaced apart detector devices carried by said second component and responsive to the first and second magnetic fields for generating the position signal, one of said detector devices generating a first logic signal at a high level when proximate said first magnetic field and at a low level when proximate said second magnetic field, and the other one of said detector devices generating a second logic signal at a low level when proximate said first magnetic field and at a high level when proximate said second magnetic field.

16. The sensor according to claim 15 wherein at least one of said detector devices is a Hall effect switch.

17. The sensor according to claim 15 including a concentrator means positioned adjacent at least one of said detector devices for increasing the intensity of the magnetic field in the region of said one detector device.

18. The sensor according to claim 17 wherein said concentrator means includes a generally flat plate element located perpendicular to the axis of the sensor.

19. The sensor according to claim 15 including a first concentrator means positioned adjacent one of said detector devices for increasing the intensity of the magnetic field in the region of said one detector device and a second concentrator means positioned adjacent the other one of said detector devices for increasing the intensity of the magnetic field in the region of said other detector device.

20. The sensor according to claim 15 wherein said first component includes an elongate shaft and said second component includes an elongate housing having a longitudinally extending cavity formed therein for slidably receiving one end of said shaft.

21. The sensor according to claim 20 wherein said magnet means includes a first magnet for generating the first magnetic field and a second magnet for generating the second magnetic field.

22. The sensor according to claim 21 wherein said first and second magnet are generally elongate and said shaft is provided with an elongate slot for receiving said magnets.

23. The sensor according to claim 21 wherein said first and second magnets abut one another.

24. The sensor according to claim 15 wherein the position signal represents whether the relative position between the two members is within a predetermined trim region, whether the relative position between the two members is on one side of the trim region, or whether the relative position between the two members is on the other side of the trim region.

25. A height sensor for use in an automatic vehicle suspension system, said sensor adapted to be connected between sprung and unsprung frame members of the vehicle for generating a position signal representative of the height of the sprung frame member relative to the unsprung frame member, said sensor comprising:
   an assembly including a first component slidable along an axis relative to a second component;
   means for attaching said first component to one of the sprung and unsprung frame members and said second component to the other one of the sprung and unsprung frame members;
   magnet means carried by said first component and including a first elongate magnet for generating a first magnetic field having a first polarity along a first portion of said first component and a second elongate magnet for generating a second magnetic field having an opposite polarity and extending axially along a second portion of said first component, said first and second magnets having end portions in abutting relationship relative to one another; and
   detector means carried by said second component including a pair of axially spaced apart Hall effect switches in facing relationship to said first and second magnets, one of said Hall effect switches adapted to generate a first logic signal at a high level when proximate the first magnetic field and at a low level when proximate the second magnetic field, the other one of said Hall effect switches adapted to generate a second logic signal and a low level when proximate the first magnetic field and at a high level when proximate the second magnetic field, said first and second logic signal cooperating to define the position signal.

26. The height sensor according to claim 25 wherein said detector means includes a first concentrator means positioned adjacent one of said Hall effect switches for increasing the intensity of the magnetic field in the region of said one switch and a second concentrator means positioned adjacent the other one of said Hall effect switches for increasing the intensity of the magnetic field in the region of said other switch.

27. The sensor according to claim 25 wherein the position signal represents whether the relative position between the two members is within a predetermined trim region, whether the relative position between the two members is on one side of the trim region, or whether the relative position between the two members is on the other side of the trim region.

28. A method of installing a position sensor between two members relatively movable relative to one another, the position sensor having two components movable relative to one another with each component having a connection means adapted to be attached to one of the members, said method comprising the steps of:
   (a) providing a fixed connection point on one of the members for receiving one of the connection means;
   (b) providing an adjustable connection point on the other one of the members for receiving the other one of the connection means;
   (c) establishing a predetermined spacing between the two movable members;
   (d) temporarily securing the two components of the position sensor to establish a predetermined spacing between the two connection means and prevent relative movement between the components;
   (e) attaching the connection means of one of the components to the fixed connection point;
   (f) attaching the connection means of the other of the components to the adjustable connection point;
   (g) securing the adjustable connection means relative to the associated member; and
   (h) causing the temporarily secured components of the position sensor to release, thereby permitting relative movement therebetween.

29. The method according to claim 28 wherein step (d) is performed by spot welding the two components of the position sensor together.

30. The method according to claim 35 wherein step (h) is performed by permitting relative movement between the two members, thereby causing the spot weld between the two components to fracture.

* * * * *